US007662038B2

(12) United States Patent
Bozeman

(10) Patent No.: US 7,662,038 B2
(45) Date of Patent: Feb. 16, 2010

(54) MULTI-MATRIX LOTTERY

(75) Inventor: Alan Kyle Bozeman, Alpharetta, GA (US)

(73) Assignee: Scientific Games International, Inc., Newark, DE (US)

( * ) Notice: Subject to any disclaimer, the term of this patent is extended or adjusted under 35 U.S.C. 154(b) by 249 days.

(21) Appl. No.: 11/327,627

(22) Filed: Jan. 6, 2006

(65) Prior Publication Data

US 2006/0154716 A1 Jul. 13, 2006

Related U.S. Application Data

(60) Provisional application No. 60/641,969, filed on Jan. 7, 2005, provisional application No. 60/722,826, filed on Sep. 30, 2005.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/17; 463/18; 463/19; 273/269

(58) Field of Classification Search ............. 463/17–19; 273/269
See application file for complete search history.

(56) References Cited

U.S. PATENT DOCUMENTS 1,527,929 A 2/1925 Simons
3,089,123 A 5/1963 Hennis et al.
3,245,697 A 4/1966 BNugent
3,699,311 A 10/1972 Dunbar
3,736,368 A 5/1973 Vogelman et al.
3,826,499 A 7/1974 Lenkoff
3,868,057 A 2/1975 Chavez
3,876,865 A 4/1975 Bliss
3,902,253 A 9/1975 Sabuzawa et al.
3,918,174 A 11/1975 Miller et al.
3,922,529 A 11/1975 Orloff
3,934,120 A 1/1976 Maymarev
4,017,834 A 4/1977 Cuttill et al.
4,095,824 A 6/1978 Bachman
4,105,156 A 8/1978 Dethloff
4,176,406 A 11/1979 Matkan
4,191,376 A 3/1980 Goldman et al.

(Continued)

FOREIGN PATENT DOCUMENTS

AU B-18428/92 12/1992

(Continued)

OTHER PUBLICATIONS

PCT/US06/00580 Written Opinion and Search Report Aug. 24, 2007.

(Continued)

*Primary Examiner*—Dmitry Suhol
*Assistant Examiner*—Jason Pinheiro
(74) *Attorney, Agent, or Firm*—Dority & Manning, P.A.

(57) ABSTRACT

The invention is a system and method for hosting a multi-matrix game where a player makes selection from two matrices and the winning numbers are also drawn from these two matrices. Matches are allowed between the player's selection from one matrix and the winning numbers selected from a different matrix.

7 Claims, 10 Drawing Sheets

| Matches | Prizes |
|---|---|
| 6 | $1,000,000 |
| 5 | $500 |
| 4 | $50 |
| 3 | $5 |
| 2 | $2 |

U.S. PATENT DOCUMENTS

| | | | |
|---|---|---|---|
| 4,194,296 | A | 3/1980 | Pagnozzi et al. |
| 4,195,772 | A | 4/1980 | Nishimura |
| 4,206,920 | A | 6/1980 | Weatherford et al. |
| 4,241,942 | A | 12/1980 | Bachman |
| 4,243,216 | A | 1/1981 | Mazumber |
| 4,273,362 | A | 6/1981 | Carrier et al. |
| 4,309,452 | A | 1/1982 | Sachs |
| 4,313,087 | A | 1/1982 | Weitzen et al. |
| 4,355,300 | A | 10/1982 | Weber |
| 4,375,666 | A | 3/1983 | Buck et al. |
| 4,398,708 | A | 8/1983 | Goldman et al. |
| 4,407,443 | A | 10/1983 | McCorkle |
| 4,451,759 | A | 5/1984 | Heynisch |
| 4,455,039 | A | 6/1984 | Weitzen et al. |
| 4,457,430 | A | 7/1984 | Darling et al. |
| 4,464,423 | A | 8/1984 | LaBianca et al. |
| 4,466,614 | A | 8/1984 | Bachman et al. |
| 4,488,646 | A | 12/1984 | McCorkle |
| 4,491,319 | A | 1/1985 | Nelson |
| 4,494,197 | A | 1/1985 | Troy et al. |
| 4,536,218 | A | 8/1985 | Ganho |
| 4,544,184 | A | 10/1985 | Freund et al. |
| 4,579,371 | A | 4/1986 | Long et al. |
| 4,591,189 | A | 5/1986 | Holmen et al. |
| 4,634,149 | A | 1/1987 | Donovan |
| 4,665,502 | A | 5/1987 | Kreisner |
| 4,669,729 | A | 6/1987 | Solitt et al. |
| 4,689,742 | A | 8/1987 | Troy et al. |
| 4,726,608 | A | 2/1988 | Walton |
| 4,736,109 | A | 4/1988 | Dvorzsak |
| 4,740,016 | A | 4/1988 | Konecny et al. |
| 4,760,247 | A | 7/1988 | Keane et al. |
| 4,763,927 | A | 8/1988 | Schneider |
| 4,775,155 | A | 10/1988 | Lees |
| 4,792,667 | A | 12/1988 | Chen |
| 4,805,907 | A | 2/1989 | Hagiwara |
| 4,817,951 | A | 4/1989 | Crouch et al. |
| 4,835,624 | A | 5/1989 | Black et al. |
| 4,836,546 | A | 6/1989 | Dire et al. |
| 4,836,553 | A | 6/1989 | Suttle et al. |
| 4,837,728 | A | 6/1989 | Barrie et al. |
| 4,856,787 | A | 8/1989 | Itkis |
| 4,861,041 | A | 8/1989 | Jones et al. |
| 4,870,260 | A | 9/1989 | Niepolomski et al. |
| 4,880,964 | A | 11/1989 | Donahue |
| 4,888,244 | A | 12/1989 | Klinge |
| 4,922,522 | A | 5/1990 | Scanlon |
| 4,943,090 | A | 7/1990 | Fienberg |
| 4,960,611 | A | 10/1990 | Fujisawa et al. |
| 4,961,578 | A | 10/1990 | Chateau |
| 4,964,642 | A | 10/1990 | Kamille |
| 4,996,705 | A | 2/1991 | Entenmann et al. |
| 4,998,010 | A | 3/1991 | Chandler et al. |
| 4,998,199 | A | 3/1991 | Tashiro et al. |
| 5,032,708 | A | 7/1991 | Comerford et al. |
| 5,037,099 | A | 8/1991 | Burtch |
| 5,046,737 | A | 9/1991 | Fienberg |
| 5,074,566 | A | 12/1991 | Desbiens |
| 5,083,815 | A | 1/1992 | Scrymgeour et al. |
| 5,092,598 | A | 3/1992 | Kamille |
| 5,094,458 | A | 3/1992 | Kamille |
| 5,100,139 | A | 3/1992 | Di Bella |
| 5,109,153 | A | 4/1992 | Johnson et al. |
| 5,112,050 | A | 5/1992 | Koza et al. |
| 5,116,049 | A | 5/1992 | Sludikoff et al. |
| 5,118,109 | A | 6/1992 | Gumina |
| 5,119,295 | A | 6/1992 | Kapur |
| 5,158,293 | A | 10/1992 | Mullins |
| 5,165,967 | A | 11/1992 | Theno et al. |
| 5,186,463 | A | 2/1993 | Marin et al. |
| 5,189,292 | A | 2/1993 | Batterman et al. |
| 5,193,815 | A | 3/1993 | Pollard |
| 5,193,854 | A | 3/1993 | Borowski, Jr. et al. |
| 5,228,692 | A | 7/1993 | Carrick et al. |
| 5,232,221 | A | 8/1993 | Sludikoff et al. |
| 5,234,798 | A | 8/1993 | Heninger et al. |
| 5,249,801 | A | 10/1993 | Jarvis |
| 5,259,616 | A | 11/1993 | Bergmann |
| 5,273,281 | A | 12/1993 | Lovell |
| 5,276,980 | A | 1/1994 | Carter et al. |
| 5,282,620 | A | 2/1994 | Keesee |
| 5,308,992 | A | 5/1994 | Crane et al. |
| 5,317,135 | A | 5/1994 | Finocchio |
| 5,326,104 | A | 7/1994 | Pease et al. |
| 5,332,219 | A | 7/1994 | Marnell, II et al. |
| 5,342,047 | A | 8/1994 | Heidel et al. |
| 5,342,049 | A | 8/1994 | Wichinsky et al. |
| 5,344,144 | A | 9/1994 | Canon |
| 5,346,258 | A | 9/1994 | Behn et al. |
| 5,380,007 | A | 1/1995 | Travis et al. |
| 5,393,057 | A | 2/1995 | Marnell, II et al. |
| 5,401,024 | A | 3/1995 | Simunek |
| 5,401,541 | A | 3/1995 | Simunek |
| 5,403,039 | A | 4/1995 | Borowski, Jr. et al. |
| 5,407,199 | A | 4/1995 | Gumina |
| 5,420,406 | A | 5/1995 | Izawa et al. |
| 5,432,005 | A | 7/1995 | Tanigami et al. |
| 5,451,052 | A | 9/1995 | Behm et al. |
| 5,453,602 | A | 9/1995 | Sakuma |
| 5,456,465 | A | 10/1995 | Durham |
| 5,471,040 | A | 11/1995 | May |
| 5,475,205 | A | 12/1995 | Behm et al. |
| 5,486,005 | A | 1/1996 | Neal |
| 5,513,846 | A | 5/1996 | Niederlien et al. |
| 5,528,154 | A | 6/1996 | Leichner et al. |
| 5,536,016 | A | 7/1996 | Thompson |
| 5,540,442 | A | 7/1996 | Orselli et al. |
| 5,548,110 | A | 8/1996 | Storch et al. |
| 5,550,746 | A | 8/1996 | Jacobs |
| 5,560,610 | A | 10/1996 | Behm et al. |
| 5,564,700 | A | 10/1996 | Celona |
| 5,564,977 | A | 10/1996 | Algie |
| 5,591,956 | A | 1/1997 | Longacre, Jr. et al. |
| 5,599,046 | A | 2/1997 | Behm et al. |
| 5,602,381 | A | 2/1997 | Hoshino et al. |
| 5,621,200 | A | 4/1997 | Irwin et al. |
| 5,628,684 | A | 5/1997 | Bouedec |
| 5,630,753 | A | 5/1997 | Fuchs |
| 5,651,735 | A | 7/1997 | Baba |
| 5,655,961 | A | 8/1997 | Acres et al. |
| 5,667,250 | A | 9/1997 | Behm et al. |
| 5,682,819 | A | 11/1997 | Beatty |
| 5,690,366 | A | 11/1997 | Luciano |
| 5,704,647 | A | 1/1998 | Desbiens |
| 5,722,891 | A | 3/1998 | Inoue |
| 5,726,898 | A | 3/1998 | Jacobs |
| 5,732,948 | A | 3/1998 | Yoseloff |
| 5,741,183 | A | 4/1998 | Acres et al. |
| 5,743,800 | A | 4/1998 | Huard et al. |
| 5,752,882 | A | 5/1998 | Acres et al. |
| 5,756,220 | A | 5/1998 | Hoshino et al. |
| 5,768,142 | A | 6/1998 | Jacobs |
| 5,769,458 | A | 6/1998 | Carides et al. |
| 5,770,533 | A | 6/1998 | Franchi |
| 5,772,509 | A | 6/1998 | Weiss |
| 5,772,510 | A | 6/1998 | Roberts |
| 5,772,511 | A | 6/1998 | Smeltzer |
| RE35,864 | E | 7/1998 | Weingardt |
| 5,779,840 | A | 7/1998 | Boris |
| 5,789,459 | A | 8/1998 | Inagaki et al. |
| 5,791,990 | A | 8/1998 | Schroeder et al. |
| 5,797,794 | A | 8/1998 | Angell |
| 5,803,504 | A | 9/1998 | Deshiens et al. |
| 5,816,920 | A | 10/1998 | Hanai |

| | | | |
|---|---|---|---|
| 5,818,019 | A | 10/1998 | Irwin, Jr. et al. |
| 5,820,459 | A | 10/1998 | Acres et al. |
| 5,823,874 | A | 10/1998 | Adams |
| 5,830,063 | A | 11/1998 | Byrne |
| 5,830,066 | A | 11/1998 | Goden et al. |
| 5,830,067 | A | 11/1998 | Graves et al. |
| 5,833,537 | A | 11/1998 | Barrie |
| 5,835,576 | A | 11/1998 | Katz et al. |
| 5,836,086 | A | 11/1998 | Elder |
| 5,836,817 | A | 11/1998 | Acres et al. |
| 5,848,932 | A | 12/1998 | Adams |
| 5,863,075 | A | 1/1999 | Rich et al. |
| 5,871,398 | A | 2/1999 | Schneier et al. |
| 5,876,284 | A | 3/1999 | Acres et al. |
| 5,882,261 | A | 3/1999 | Adams |
| 5,883,537 | A | 3/1999 | Luoni et al. |
| 5,885,158 | A | 3/1999 | Torango et al. |
| 5,887,906 | A | 3/1999 | Sultan |
| 5,903,340 | A | 5/1999 | Lawady et al. |
| 5,911,418 | A | 6/1999 | Adams |
| 5,915,588 | A | 6/1999 | Stoken et al. |
| 5,934,671 | A | 8/1999 | Harrison |
| 5,970,143 | A | 10/1999 | Schneier et al. |
| 5,979,894 | A | 11/1999 | Alexoff |
| 5,996,997 | A | 12/1999 | Kamille |
| 5,997,044 | A | 12/1999 | Behm et al. |
| 6,003,307 | A | 12/1999 | Naber et al. |
| 6,004,207 | A | 12/1999 | Wilson, Jr. et al. |
| 6,004,208 | A | 12/1999 | Takemoto et al. |
| 6,007,162 | A | 12/1999 | Hinz et al. |
| 6,012,982 | A | 1/2000 | Piechowiak et al. |
| 6,014,032 | A | 1/2000 | Maddix et al. |
| 6,017,032 | A | 1/2000 | Grippo et al. |
| 6,024,641 | A | 2/2000 | Sarno |
| 6,053,405 | A | 4/2000 | Irwin, Jr. et al. |
| 6,077,162 | A | 6/2000 | Weiss |
| 6,080,062 | A | 6/2000 | Olson |
| 6,086,477 | A | 7/2000 | Walker et al. |
| 6,089,978 | A | 7/2000 | Adams |
| 6,099,407 | A | 8/2000 | Parker, Jr. et al. |
| 6,102,400 | A | 8/2000 | Scott et al. |
| 6,107,913 | A | 8/2000 | Gatto et al. |
| 6,119,364 | A | 9/2000 | Elder |
| 6,125,368 | A | 9/2000 | Bridge et al. |
| 6,142,872 | A | 11/2000 | Walker et al. |
| 6,146,272 | A | 11/2000 | Walker et al. |
| 6,149,521 | A | 11/2000 | Sanduski |
| 6,155,491 | A | 12/2000 | Dueker et al. |
| 6,168,521 | B1 | 1/2001 | Luciano et al. |
| 6,168,522 | B1 | 1/2001 | Walker et al. |
| 6,179,710 | B1 | 1/2001 | Sawyer et al. |
| 6,203,430 | B1 | 3/2001 | Walker et al. |
| 6,206,373 | B1 | 3/2001 | Garrod |
| 6,210,275 | B1 | 4/2001 | Olsen |
| 6,217,448 | B1 | 4/2001 | Olsen |
| 6,220,961 | B1 | 4/2001 | Keane et al. |
| 6,224,055 | B1 | 5/2001 | Walker et al. |
| 6,227,969 | B1 | 5/2001 | Yoseloff |
| 6,238,288 | B1 | 5/2001 | Walker et al. |
| 6,309,300 | B1 | 10/2001 | Glavich |
| 6,312,334 | B1 | 11/2001 | Yoseloff |
| 6,315,291 | B1 | 11/2001 | Moody |
| 6,330,976 | B1 | 12/2001 | Dymetman et al. |
| 6,331,143 | B1 | 12/2001 | Yoseloff |
| 6,334,814 | B1 | 1/2002 | Adams |
| 6,340,158 | B2 | 1/2002 | Pierce et al. |
| 6,368,213 | B1 | 4/2002 | McNabola |
| 6,375,568 | B1 | 4/2002 | Roffman et al. |
| 6,379,742 | B1 | 4/2002 | Behm et al. |
| 6,394,899 | B1 | 5/2002 | Walker et al. |
| 6,398,214 | B1 | 6/2002 | Moteki et al. |
| 6,398,643 | B1 | 6/2002 | Knowles et al. |
| 6,398,644 | B1 | 6/2002 | Perrie et al. |
| 6,398,645 | B1 | 6/2002 | Yoseloff |
| 6,416,408 | B2 | 7/2002 | Tracy et al. |
| 6,419,579 | B1 | 7/2002 | Bennett |
| 6,435,408 | B1 | 8/2002 | Irwin, Jr. et al. |
| 6,435,500 | B2 | 8/2002 | Gumina |
| 6,478,677 | B1 | 11/2002 | Moody |
| 6,491,215 | B1 | 12/2002 | Irwin, Jr. et al. |
| 6,497,408 | B1 | 12/2002 | Walker et al. |
| 6,552,290 | B1 | 4/2003 | Lawandy |
| 6,220,596 | B1 | 7/2003 | Walker et al. |
| 6,588,747 | B1 | 7/2003 | Seelig |
| 6,599,186 | B1 | 7/2003 | Walker et al. |
| 6,601,772 | B1 | 8/2003 | Rubin et al. |
| 6,637,747 | B1 | 10/2003 | Garrod |
| 6,648,735 | B2 | 11/2003 | Miyashita et al. |
| 6,648,753 | B1 | 11/2003 | Tracy et al. |
| 6,648,755 | B1 | 11/2003 | Luciano et al. |
| 6,676,126 | B1 | 1/2004 | Walker et al. |
| 6,692,354 | B2 | 2/2004 | Tracy et al. |
| 6,702,047 | B2 | 3/2004 | Huber |
| 6,773,345 | B2 | 8/2004 | Walker et al. |
| 6,776,337 | B2 | 8/2004 | Irwin, Jr. et al. |
| 6,786,824 | B2 | 9/2004 | Cannon |
| 6,823,874 | B2 | 11/2004 | Lexcen |
| 6,875,105 | B1 | 4/2005 | Behm et al. |
| 6,929,186 | B2 | 8/2005 | Lapstun |
| 2001/0027130 | A1 | 10/2001 | Namba et al. |
| 2001/0030978 | A1 | 10/2001 | Holloway et al. |
| 2001/0034262 | A1 | 10/2001 | Banyai |
| 2001/0040345 | A1 | 11/2001 | Au-Yeung |
| 2002/0022511 | A1 | 2/2002 | Eklund et al. |
| 2002/0084335 | A1 | 7/2002 | Ericson |
| 2002/0171201 | A1 | 11/2002 | Au-Yeung |
| 2002/0187825 | A1 | 12/2002 | Tracy et al. |
| 2003/0050109 | A1 | 3/2003 | Caro et al. |
| 2003/0060261 | A1 | 3/2003 | Katz et al. |
| 2003/0114210 | A1* | 6/2003 | Meyer et al. .................. 463/17 |
| 2004/0076310 | A1 | 4/2004 | Hersch et al. |
| 2004/0166926 | A1 | 8/2004 | Adachi et al. |
| 2004/0173965 | A1 | 9/2004 | Stanek |
| 2004/0178582 | A1 | 9/2004 | Garrod |
| 2004/0185931 | A1 | 9/2004 | Hartman et al. |
| 2004/0204222 | A1 | 10/2004 | Roberts |
| 2004/0259631 | A1 | 12/2004 | Katz et al. |
| 2004/0266514 | A1 | 12/2004 | Penrice |

FOREIGN PATENT DOCUMENTS

| | | | |
|---|---|---|---|
| AU | B-21070/92 | | 7/1993 |
| AU | A-50327/96 | | 2/1997 |
| AU | B-52499/96 | | 2/1997 |
| AU | 199716432 | B2 | 9/1997 |
| AU | A-45403/97 | | 4/1998 |
| AU | A-63553/98 | | 10/1998 |
| DE | 2938307 | C2 | 4/1981 |
| DE | 3035898 | A1 | 4/1982 |
| DE | 3035947 | A1 | 5/1982 |
| DE | 2938307 | C3 | 6/1982 |
| DE | 3822636 | A1 | 1/1990 |
| DE | 2938307 | C3 | 8/1990 |
| DE | 3822636 | A1 | 1/1992 |
| DE | 3415114 | A1 | 10/1995 |
| DE | 19646956 | C1 | 5/1998 |
| DE | 19706286 | A1 | 5/1998 |
| DE | 29803107 | U1 | 8/1998 |
| DE | 29816453 | U1 | 3/1999 |
| DE | 19751746 | A1 | 5/1999 |
| EP | 0122902 | B1 | 4/1984 |
| EP | 0333934 | A1 | 9/1989 |
| EP | 0458623 | | 11/1991 |
| EP | 0798676 | A1 | 10/1997 |
| EP | 0799649 | A1 | 10/1997 |
| EP | 0149712 | A2 | 7/1998 |

| | | | |
|---|---|---|---|
| EP | 0874337 | A1 | 10/1998 |
| EP | 0896304 | A2 | 2/1999 |
| EP | 0914875 | A2 | 5/1999 |
| EP | 0914875 | A3 | 5/1999 |
| EP | 0919965 | A2 | 6/1999 |
| EP | 0983801 | A2 | 3/2000 |
| EP | 0983801 | A3 | 3/2001 |
| EP | 1149712 | A1 | 10/2001 |
| ES | 529535 | | 6/1983 |
| ES | 529536 | | 6/1983 |
| ES | 2006400 | | 4/1989 |
| ES | 2006401 | | 4/1989 |
| GB | 642892 | A | 9/1950 |
| GB | 2075918 | A | 11/1981 |
| GB | 2222712 | B | 3/1990 |
| GB | 2230373 | A | 10/1990 |
| GB | 2295775 | A | 12/1996 |
| GB | 3328311 | | 2/1999 |
| GB | 23282311 | A | 2/1999 |
| WO | WO85/02250 | A1 | 5/1985 |
| WO | WO91/17529 | | 11/1991 |
| WO | WO 98/03910 | | 1/1998 |
| WO | WO 98/40138 | | 9/1998 |
| WO | WO 99/09364 | A1 | 2/1999 |
| WO | WO 99/26204 | | 5/1999 |
| WO | WO 99/39312 | | 8/1999 |
| WO | WO00/00256 | | 1/2000 |
| WO | WO00/78418 | A1 | 12/2000 |
| WO | WO 01/74460 | * | 10/2001 |
| WO | WO01/74460 | A2 | 11/2001 |
| WO | WO01/93966 | A1 | 12/2001 |
| WO | WO02/056266 | A1 | 7/2002 |

OTHER PUBLICATIONS

Chip Brown, 'Austin American-Statesman', (Article), May 28, 1998, 2 Pgs., Texas.

John C. Hallyburton, Jr., 'Frequently Asked Questions About Keno', (Internet Article),1995, 1998, 10 Pgs., (http://conielco.com/faq/keno.html).

Judith Gaines, 'Pool Party Betting Business Booming Throughout Area Workplaces', (Internet Article), Mar. 19, 1994, 2 Pgs., Issue 07431791, Boston Globe, Boston, MA.

'Maryland Launches Let It Ride', (Internet Article), Circa 2001,1 Pg.

'Notice of Final Rulemaking', (Internet Article) Mar. 24, 2000, 10 Pgs., vol. 6, Issue #13, Arizona Administrative Register, Arizona.

'How To Play Megabucks', (Internet Article), Mar. 9, 2001, 2 Pgs., Oregon Lottery Megabucks,(http://www.oregonlottery.org/mega/m_howto.htm).

'How To Play Megabucks', (Internet Article), May 8, 2001, 2 Pgs., Oregon Lottery Megabucks, (http://www.oregonlottery.org/mega/m_howto.htm).

'Oregon Lottery', (Internet Article), Apr. 30, 2004, 9 Pgs., Oregon Lottery Web Center, (http://www.oregonlottery.org/general/g_hist.shtml).

'Powerball Odd & Prizes', 'How to Play Powerball', (Internet Article),Dec. 2002, 2 Pgs., (www.powerball.com/pbhowtoplay.shtm).

Mike Parker, 'The History of Horse Racing' (Internet Article), 1996, 1997, 1998, 5 Pgs., http://www.mrmike.com/explore/hrhist.htm.

* cited by examiner

| Matrix 1 | Matrix 2 | Prizes |
| --- | --- | --- |
| 5 | 1 | Jackpot |
| 5 | 0 | $175,000 |
| 4 | 1 | $5,000 |
| 4 | 0 | $150 |
| 3 | 1 | $150 |
| 3 | 0 | $7 |
| 2 | 1 | $10 |
| 1 | 1 | $3 |
| 0 | 0 | $2 |

Prior Art

FIG. 1

| Matches | Prizes |
| --- | --- |
| 6 | $1,000,000 |
| 5 | $500 |
| 4 | $50 |
| 3 | $5 |
| 2 | $2 |

FIG. 2

| | Matrix 1 | Matrix 2 |
|---|---|---|
| Player's Selection: | 1, 2, 3, 4, 5 | 6 |
| Lottery's Selection: | 1, 2, 3, 5, 6 | 4 |

FIG. 3

| | Matrix 1 | Matrix 2 |
|---|---|---|
| Player's Selection: | 1, 2, 3, 4, 5 | 6 |
| Lottery's Selection: | 1, 2, 7, 8, 9 | 5 |

FIG. 4

| Matches | Distinct | Indistinct |
|---|---|---|
| 6 | 0.00000004439645680758 | 0.00000212363051729568 |
| 5 | 0.00001247540436292860 | 0.00019892572413580800 |
| 4 | 0.00071478295460195900 | 0.00460902556288788000 |
| 3 | 0.01424460316671050000 | 0.03711425398561790000 |
| 2 | 0.11709676474140000000 | 0.12581252175426400000 |
| 1 | 0.40136390354958600000 | 0.29880173963076400000 |
| 0 | 0.46656742578688300000 | 0.53346140971181400000 |

FIG. 5

| Matches | Probability |
|---|---|
| 6 | 0.0000002443228087759 |
| 5 | 0.0000304033197257055 |
| 4 | 0.0010892293592448499 |
| 3 | 0.0164436080531439000 |
| 2 | 0.1179348183003290000 |
| 1 | 0.3915021570189300000 |
| 0 | 0.4729995396258180000 |

FIG. 6

| Matches | Return |
|---|---|
| 6 | 24.4% |
| 5 | 1.5% |
| 4 | 5.4% |
| 3 | 8.2% |
| 2 | 23.6% |
| Total | 63.2% |

FIG. 7

| Regular | Special | Prize | Probability (per play) |
|---|---|---|---|
| 4 | 1 | Jackpot | 1 in 975,415.0 |
| 4 | 0 | $2,500 | 1 in 32,513.8 |
| 3 | 1 | $20 | 1 in 9,031.6 |
| 3 | 0 | $5 | 1 in 301.1 |
| 2 | 1 | $3 | 1 in 463.2 |
| 2 | 0 | $2 | 1 in 15.4 |

| Cross Matches | Multiplier | 1/Probability (per play) |
|---|---|---|
| 2 | 10 | 60.1 |
| 1 | 2 | 4.4 |

| Prize | Probability (per ticket) |
|---|---|
| Jackpot | 1 in 487,707.5 |
| $25,000 or more (avg. $25,000) | 1 in 325,138.3 |
| $5,000 to $24,999 (avg. $5,000) | 1 in 31,465.1 |
| $2,500 to $4,999 (avg. $2,500) | 1 in 37,517.2 |
| $200 to $2,499 (avg. $200) | 1 in 12,042.5 |
| $50 to $199 (avg. $50) | 1 in 3,727.6 |
| $20 to $49 (avg. $22) | 1 in 196.6 |
| $2 to $19 (avg. $3) | 1 in 7.7 |

| Cross Matches | Multiplier | 1/Probability (per play) |
|---|---|---|
| 2 | 20 | 60.1 |
| 1 | 2 | 4.4 |

MULTI-MATRIX LOTTERY

CROSS-REFERENCE TO RELATED APPLICATION

This application claims the benefit of U.S. Provisional Application No. 60/641,969, "Multi-Matrix Lottery", filed on Jan. 7, 2005, and U.S. Provisional Application No. 60/722,826, "Lottery Game Having Enhanced Winnings with Predefined Threshold", filed on Sep. 30, 2005, the entirety of all of which is hereby incorporated herein by this reference.

BACKGROUND OF THE INVENTION

1. Field of the Invention

The invention relates in general to lottery game methods. More particularly, the present invention relates to a multi-matrix lottery game method in which matches are credited across different matrices.

2. Description of the Related Art

It is known in lottery games to utilize a selection process defined by three parameters comprising first a set of indicia; next, the game player's selection from the set of game indicia, and last the lottery authority's selection from the set of game indicia. This is the structure upon which most known types of lottery games are based. Some lottery games use more than one selection process in which the prizes awarded are based on the how the outcomes from the individual processes combine, but the outcomes for the individual processes are independent of one another.

Referring now to the drawings and the description below, many lottery games can be expressed in terms of "matrices." As mathematically known, a matrix is a triple, (x, y, z), where x represents the number of objects selected by the player, y the number selected, or "drawn," by the lottery authority, and z is the number of objects from which the player and lottery authority are making selections. Prizes are based on the number of matches between the player's and the lottery authority's respective selections. For example, consider a lottery game in which a player selects six numbers in the range of from 1 to 49, the lottery authority selects six numbers in the range of from 1 to 49, and prizes are based on the number of matches between the player's and the lottery authority's respective selections. This scenario could be described as a (6, 6, 49) matrix. Note, however, that the x and y in the matrices need not be the same. For example, in Keno-style game methods, the lottery authority draws 20 out of 80 numbers, and the game player may choose the size of their selection, ranging from 1 to 10 numbers. If the player chooses 6 numbers out of 80, for example, this game could be described as a (6, 20, 80) matrix.

There are also more complex "multi-matrix" lottery games, wherein the player and lottery authority make selections from more than one set of objects. A well-known example is MEGA MILLIONS®, a large-jackpot multi-state lottery game played in selected lottery jurisdictions within the United States. In MEGA MILLIONS®, players select five numbers in a range of from 1 to 52, the first set of objects, and one number in a range of from 1 to 52, the second set of numbers. Likewise, the lottery authority draws five numbers in a range of from 1 to 52, the first set, and one number in a range of from 1 to 52, the second set of numbers. MEGA MILLIONS® can thus be described as a two-matrix game, the first matrix being (5, 5, 52) and the second matrix being (1, 1, 52). Matches are tallied for the (5, 5, 52) matrix, and matches are tallied for the (1, 1, 52) matrix. Prizes are based on the number of matches for both matrices. For example, a player is awarded $5,000 according to the prize table of FIG. 1, if he matches four in the (5, 5, 52) matrix and one in the (1, 1, 52) matrix.

"Numbers games," e.g. lottery games based on permutations of three or four digits, can technically be considered multi-matrix games. For example, a three-digit game is composed of three identical matrices, (1, 1, 10). A player wins a "straight" bet if he matches his number with the lottery authority's for each matrix. A player wins a "box" bet if there is a one-to-one association between the player's numbers and the three matrices such that the player's numbers match those produced by the associated matrices. For example, suppose the player's selection is 1-2-2 and the lottery authority's draw is 2-1-2. Associating the player's $1^{st}$ number with the $2^{nd}$ matrix, the player's $2^{nd}$ number with the $1^{st}$ matrix and the player's $3^{rd}$ number with the $3^{rd}$ matrix, there are three matches.

Note that for a box bet the association between the player's selection and the matrices must be one-to-one. For example, suppose that the player's bet is 1-2-2 and the lottery authority's draw is 1-2-1. Associating the player's $1^{st}$ number with the $1^{st}$ matrix, the player's $2^{nd}$ number with the $2^{nd}$ matrix and the player's $3^{rd}$ number with the $2^{nd}$ matrix, would result in three matches. However, it is disallowed that both the player's $2^{nd}$ and $3^{rd}$ numbers be associated with the $2^{nd}$ matrix.

In a multi-matrix game, such as MEGA MILLIONS®, a match is determined by comparing player indicia to lottery authority indicia within the same matrix. The number of matches is determined for each matrix separately and prizes are based on the resulting numbers of matches. The present invention allows for matches determined by comparing player indicia with regard to one matrix to the lottery authority indicia with regard to a different matrix. The matrices may have different parameterizations. This may allow for a more interesting play experience and more appealing prizes. Thus, it is to a multi-matrix lottery games with more interesting play characteristics and more appealing prizes, the present invention is primarily directed.

SUMMARY OF THE INVENTION

A multi-matrix lottery game is disclosed for which matches are allowed between a player's selection with regard to one matrix and the lottery authority's selection with regard to a different matrix. The matrices may have different parameters.

In one embodiment, there is disclosed a lottery game method. The lottery game method includes the player receiving a first plurality of indicia selected from a first set of indicia, the player receiving a second at least one indicia selected from a second set of indicia, the lottery authority receiving a first plurality of indicia selected from the first set of indicia, the lottery authority receiving a second at least one indicia selected from the second set of indicia, determining a first number of matches by comparing the player's first plurality of indicia with the lottery authority's first plurality of indicia, determining a second number of matches by comparing the player's second at least one indicia with the lottery authority's first plurality of indicia, determining a third number of matches by comparing the player's first plurality of indicia with the lottery authority's second at least one indicia, determining a fourth number of matches by comparing the player's second at least one indicia with the lottery authority's second at least one indicia, and awarding a prize based on these first, second, third, and fourth number of matches.

In another embodiment, there is provided a system for playing a lottery game. The system includes a communication network, at least one gaming machine in communication with the communication network, and a server in communication with the at least one gaming machine through the communication network, wherein the server hosting a lottery game. The at least one gaming machine being capable of receiving from a player a first plurality of indicia selected from a first set of indicia, receiving from the player a second at least one indicia selected from a second set of indicia, and transmitting information on the first plurality of indicia and the at least one second indicia to the server via the communication network. The server being capable of receiving from the lottery authority a first plurality of indicia selected from the first set of indicia, receiving from the lottery authority a second at least one indicia selected from the second set of indicia, determining a first number of matches by comparing the first plurality of indicia received from the player with the first plurality of indicia received from the lottery authority, determining a second number of matches by comparing the second at least one of indicia received from the player with the first plurality of indicia received from the lottery authority, determining a third number of matches by comparing the first plurality of indicia received from the player with the second at least one indicia received from the lottery authority, and determining a fourth number of matches by comparing the second at least one indicia received from the player with the second at least one indicia received from the lottery authority.

BRIEF DESCRIPTION OF THE DRAWINGS

FIG. 1 is an illustration of a MEGA MILLIONS® lottery game prize table based on a play or ticket price of $1.

FIG. 2 is an illustration of the odds and prize table for one embodiment of the game of the present invention.

FIG. 3 is an illustration of a game player's and a lottery's selections in one embodiment of the game of the present invention.

FIG. 4 is an illustration of a game player's and a lottery's selections in a second embodiment of the game method of the present invention.

FIG. 5 is an illustration of the conditional probabilities for "distinct" and "indistinct" player selections for an embodiment of the game of the present invention.

FIG. 6 is an illustration of probabilities of the game method of the present invention.

FIG. 7 is an illustration of game returns based on the incremental dollar for the extension game.

DETAILED DESCRIPTION OF THE INVENTION

Figures 10, 11, 12, 18:
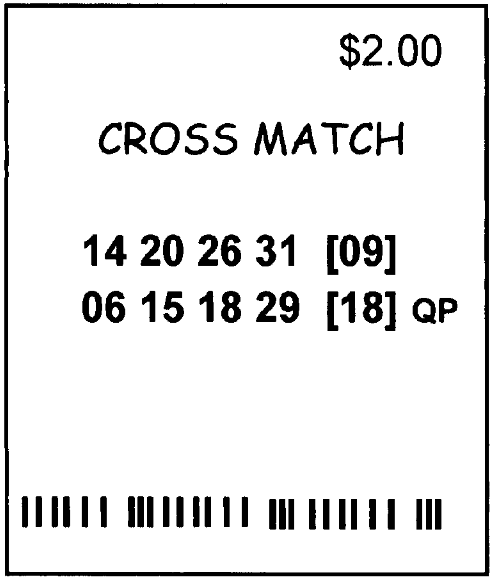
FIG. 10 is an exemplary prize table for a multi-matrix game.
FIG. 11 is an exemplary prize table base on the number of cross-matches.
FIG. 12 is an exemplary composite prize table that incorporates a base prize table with a cross-match prize table.
FIG. 18 is an exemplary ticket for a multi-matrix game.

In one embodiment the present invention is a multi-matrix game for which matches are allowed between a player's selection from one matrix and the lottery authority's selection from a different matrix. Moreover, this invention differs from a "box" bet in at least three ways: at least one matrix in this game is non-trivial, i.e., x and y in the triple (x, y, z) are not both one for at least one of the matrices; the matrices do not have to be symmetric, i.e., if (x1, y1, z1) and (x2, Y2, Z2) are both matrices for the game, it is not required that (x1, y1, z1)=(x2, y2, z2); and there does not have to be a one-to-one association between the player's selections and the matrices for which comparisons are made to the lottery authority's selections. One exemplary ticket for a multi-matrix game is shown in FIG. 18.

The following embodiment is an extension that may be used with the current MEGA MILLIONS® game. The extension game is known to those skilled in the art as an add-on game to a base or parent game. As discussed above, MEGA MILLIONS® is based on two matrices of (5, 5, 52) and (1, 2, 52). FIG. 1 illustrates the MEGA MILLIONS® prize table based on a play or ticket price of $1. To participate in the extension game, the player pays an additional $1. For the extension game, a player is credited with a match for one of his selected numbers if the lottery authority selected that number from either matrix.

For example, consider the player's and the lottery authority's selections as illustrated in FIG. 3. The player selects 1, 2, 3, 4, and 5 for the $1^{st}$ matrix and 6 for the $2^{nd}$ matrix. Alternatively, the player may use quick-pick to select numbers from these two matrices. Furthermore, suppose that the lottery authority selects 1, 2, 3, 5, and 6 for the $1^{st}$ matrix and 4 for the $2^{nd}$ matrix. For the base MEGA MILLIONS® game the player has 4 matches for the $1^{st\ matrix\ and}$ 0 matches for the $2^{nd}$ matrix. As shown in FIG. 1, the player has won $150. To determine matches for the novel extension game, the player's selection is compared with the lottery authority's selection one number at a time. To wit, if the player selected 1 as one of his numbers for the $1^{st}$ matrix and the lottery authority also selected 1 for the $1^{st}$ matrix, the player is credited with a match. Continuing the game method, the player selected 2 for the $1^{st}$ matrix and the lottery authority selected 2 for the $1^{st}$ matrix and the player is credited with another match for a subtotal of 2 matches. Continuing on, the player selected 3 for the $1^{st}$ matrix and the lottery selected 3 for the $1^{st}$ matrix, the player is credited with another match for a subtotal of 3 matches. Continuing, the player selected 4 for the $1^{st}$ matrix and the lottery selected 4 for the $2^{nd}$ matrix. The player is credited with a match for a subtotal of 4 matches. Continuing, the player selected 5 for the $1^{st}$ matrix and the lottery selected 5 for the $1^{st}$ matrix, the player is credited with another match for a subtotal of 5 matches. Continuing, the player selected 6 for $2^{nd}$ matrix and the lottery authority selected 6 for the $1^{st}$ matrix, the player is credited with another match for a total of 6 matches.

An exemplary prize table for this game extension game is illustrated in FIG. 2. The prize for matching 6 for the extension game is $1,000,000. The player wins a total of $150+$1,000,000 $1,000,150 for both Mega Millions® and the extension game.

Another example of the game method is shown FIG. 4. The player authority selects 1, 2, 3, 4, and 5 for the $1^{st}$ matrix and 6 for the $2^{nd}$ matrix. The lottery authority selects 1, 2, 7, 8, and 9 for the $1^{st}$ matrix and 5 for the $2^{nd}$ matrix. For Mega Millions®, the player matches 2 for the first matrix and 0 for the $2^{nd}$ matrix. As shown in FIG. 1, the player is not entitled to any prizes for the Mega Millions® base game. For the extension game, however, the player is credited with matching 1, 2, and 5 for the first matrix and no matches for the $2^{nd}$ matrix for a total of 3 matches. Note, the player is credited with matching the 5 numbers he selected for the first matrix because the lottery authority selected 5 for the $2^{nd}$ matrix. As shown in FIG. 2, the player wins $5 for 3 matches.

With regard to this embodiment of the present invention, at least one of the matrices is non-trivial, i.e., for the first matrix, (5, 5, 52) more than one number is selected by both the player and the lottery. The matrices are not symmetric as the two matrices are different from one another, i.e., (5, 5, 52)≠(1, 2, 52). The association between the matrices is not one-to-one. The game player is allowed matches between his selection for the $1^{st}$ matrix with the lottery authority's selection for both the $1^{st}$ and $2^{nd}$ matrices. Similarly, the game player is allowed matches between his selection for the $2^{nd}$ matrix with the lottery authority's selection for both the $1^{st}$ and $2^{nd}$ matrices.

In an alternative embodiment, the lottery authority may institute one prize according to the number of matches between a player's selection for the $1^{st}$ matrix and the lottery authority's selection for both the $1^{st}$ and $2^{nd}$ matrices, and a different prize according to the number of matches between the player's selection for the $2^{nd}$ matrix and the lottery authority's selection for both the $1^{st}$ and $2^{nd}$ matrices.

The computation of the probabilities for this embodiment is now described. It is noted that there are two basic cases for a player selection as it relates to this invention: (1) the "distinct" case, wherein the number the player selected for the $2^{nd}$ matrix is distinct from the 5 numbers the player selected for the $1^{st}$ matrix, and (2) the "indistinct" case, wherein the number the player selected for the $2^{nd}$ matrix is one of the 5 numbers the player selected for the $1^{st}$ matrix. For example, the player selection of Matrix 1: 1, 2, 3, 4, 5, Matrix 2: 6, would be a distinct case, as the 6 is not included among the numbers the player selected from Matrix 1. As another example, consider the player selection of Matrix 1: 1, 2, 3, 4, 5, Matrix 2: 5. This would be an indistinct case, as 5 is one of the numbers the player selected for Matrix 1. The probabilities for these two cases are different and must therefore be computed separately.

First, it is computed the probabilities for the distinct case as it is the more straightforward. Observe that the lottery authority selects either 5 or 6 distinct numbers depending on whether or not the number drawn from the $2^{nd}$ matrix is one of the numbers drawn from the $1^{st}$ matrix. Moreover, the probability that the lottery authority's selection comprises five distinct numbers is 5/52 while the probability that the lottery authority's selection comprises six distinct numbers is 47/52. The probabilities for the number of matches can be computed using the hypergeometric distribution, as known. For example, the probability of 6 matches is:

$$47/52\times\text{hypgeomdist}(6, 6, 6, 52)=0.00000004439645680758$$

where hypgeomdist is the hypergeometric distribution with the standard parameters. The probability of 5 matches is:

$$47/52\times\text{hypgeomdist}(5, 6, 6, 52)+5/52\times\text{hypgeomdist}(5, 5,5,52)=0.00001247540436292860.$$

The other probabilities for the distinct case are computed similarly and are displayed in the "distinct" column in FIG. 5.

To compute the probabilities for the indistinct case, consider 4 matches as an illustrative case. It is useful to note that for the indistinct case one of the player's numbers for the $1^{st}$ matrix must be the player's number for the $2^{nd}$ matrix. Four matches can be attained in two ways: (1) 4 of the player's numbers for the $1^{st}$ matrix match the lottery's numbers for the $1^{st}$ and/or $2^{nd}$ matrix, but these 4 numbers do not include the player's number for the $2^{nd}$ matrix, and (2) 3 of the player's numbers for the $1^{st}$ matrix match the lottery authority's numbers for the $1^{st}$ and/or $2^{nd}$ matrix, and these 3 numbers include the player's number for the $2^{nd}$ matrix, which would be an additional match. The probability for 4 matches can be computed by computing and adding the probabilities for these two cases. Thus the probability of 4 matches is:

$$1/5\times[5/52\times\text{hypgeomdist}(4,5,5,52)+47/52\times\text{hypgeomdist}(4,6,6,52)]+4/5\times[5/52\times\text{hypgeomdist}(3,5,5,52)+47/52\times\text{hypgeomdist}(3,6,6,52)]=0.00460902556288788000.$$

The other probabilities for the indistinct case are computed similarly and displayed in the "indistinct" column in FIG. 5.

As the probabilities for indistinct and distinct selections are different, a prize structure wherein prizes are awarded based on the number of matches may produce a higher return for one type of selection than the other. For example, in FIG. 5, observe that the probabilities for getting 2, 3, 4, 5, or 6 matches are higher for the indistinct case. If the prize structure is such to award prizes for two or more matches, such a prize structure would pay out more for an indistinct selection. For such a prize structure, if players are allowed to choose their selections, those who choose an indistinct selection would be at advantage. This violates the idea that a lottery game be independent of skill.

One remedy is for a lottery terminal to quick-pick the player selection for the $2^{nd}$ matrix, i.e., the player selection is generated by a random number generator. In this case, the player has a 47 out of 52 chance of getting a distinct selection and 5 out of 52 chance of getting an indistinct selection. The game is fair to all players as a player has no control over whether or not his play is distinct or indistinct. Nonetheless, some tickets would be worth more than others by chance. For this reason it is recommended that the game be non-cancelable.

FIG. 6 illustrates the probability distribution for the number of matches assuming the player selection for the $2^{nd}$ matrix is quick-picked. This table is easily derived from FIG. 5 by weighting the "indistinct" probabilities by 5/52 and the "distinct" probabilities by 47/52. The returns based on the incremental dollar for the extension game are computed by multiplying the prize value (FIG. 2) by the probabilities (FIG. 6) and are illustrated in FIG. 7. The total return for this extension game is 63.2%.

The present invention can be described economically in terms of cross-matches. A "cross-match" is defined as a match between a player's first set of numbers and the lottery's at least one second number or a match between a player's at least one second number number and the lottery's first set of numbers. The player is awarded a number of "cross-matches" which are incorporated into the prize structure.

We disclose such an embodiment: The price is $2 for two plays. The game is based on two matrices with different parameters: the $1^{st}$ matrix's parameters are 4/4/31 and the $2^{nd}$ matrix's parameters are 1/1/31. For convenience, we refer to the $1^{st}$ matrix as "regular" and the $2^{nd}$ matrix as "special" (e.g., each play and draw is composed of 4 "regular" numbers and 1 "special" number). Also, plays are distinguished by types: "Type A" and "Type B." For a Type A play, the special number does not repeat any of the regular numbers (e.g., regular numbers: 01, 02, 03, 04, special number: 05). For a Type B play, the special number repeats one of the regular numbers (e.g., regular numbers: 01, 02, 03, 04, special number: 03, the special number repeats a regular number). This game without (or before) consideration of the cross-matches is referred to as the "base game."

Figure 17:
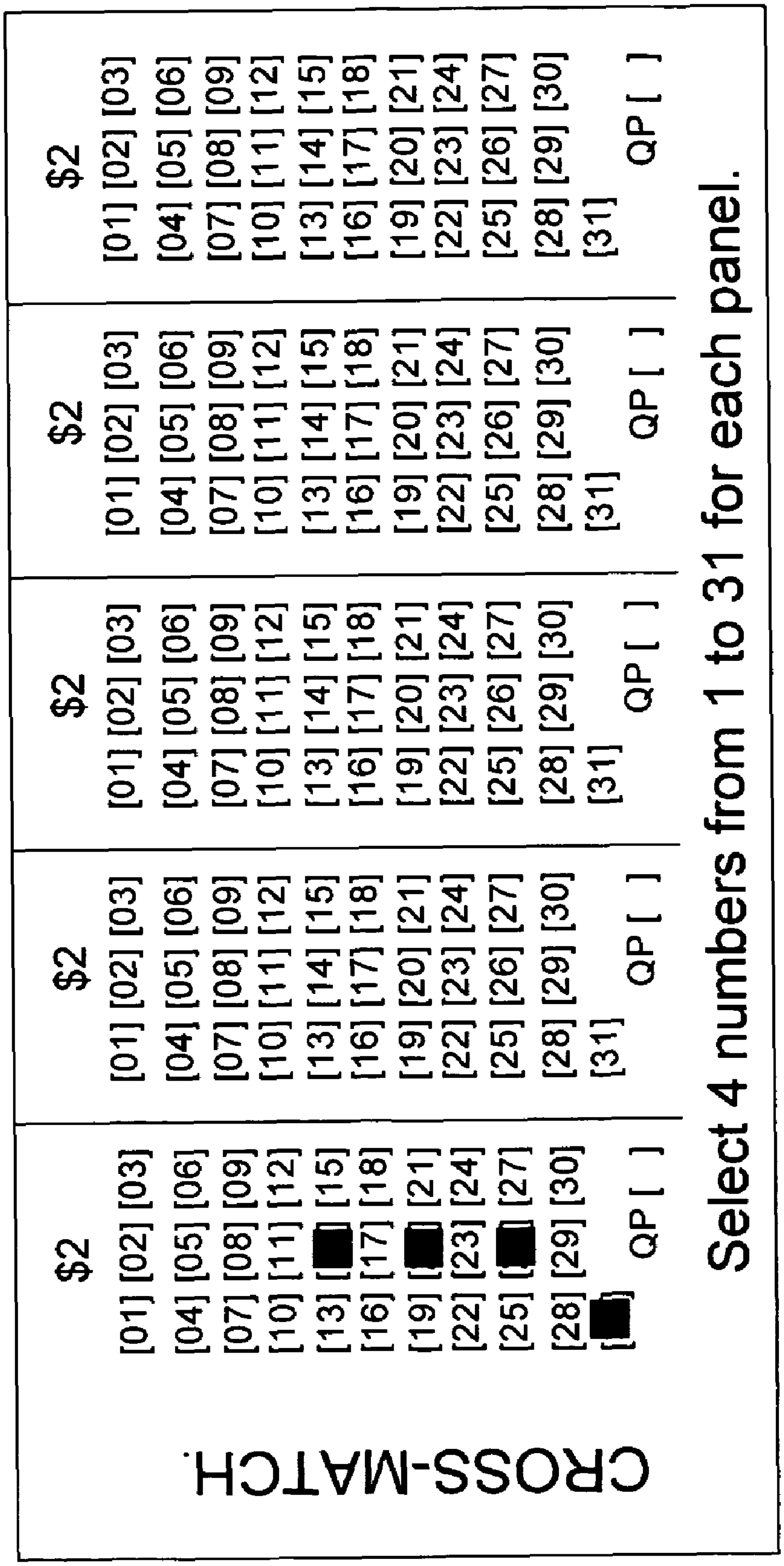
FIG. 17 is an exemplary play slip for a multi-matrix game for which the indicia for the second matrix are quick-picked.

An exemplary playslip is in FIG. 17. The player may choose the 4 regular numbers for his $1^{st}$ play. The player selects the 4 regular numbers by marking a panel (or marking QP for a quick-pick). In this example, the player has marked numbers 14, 20, 26, and 31, which will comprise the regular numbers for his $1^{st}$ play. The special number for the first play and the entire $2^{nd}$ play will be assigned by the lottery.

An exemplary corresponding ticket is in FIG. 18. The $1^{st}$ play is required to be of Type A. The regular numbers for the $1^{st}$ play are 14, 20, 26, 31, (as marked by the player on the playslip), and the special number is 09 (randomly assigned by the lottery subject to being distinct from the 4 regular numbers). The $2^{nd}$ play is required to be of Type B. The regular numbers are 06, 15, 18, 29, (randomly assigned by the lottery) and the special number is 18 (randomly selected from among the 4 regular numbers).

The top prize is a progressive, pari-mutuel jackpot that starts at $50,000 and increments a minimum of $5,000 per draw. The jackpot is won by matching the 4 regular numbers and the 1 special number with the lottery draw. 20.0% of the sales are reserved for the jackpot. (A certain level of sales is required to support this jackpot scheme, e.g., $50,000 sales per draw is sufficient.)

Prizes for the lower tiers and their associated inverse probabilities are described in FIG. 10. In addition to these prizes, multipliers are awarded for "cross-matches." A cross-match occurs when one of a play's regular numbers matches the lottery's special number, or, when one of the lottery's regular numbers matches a play's special number. It is possible for single play to attain 0,1 or 2 cross-matches. As indicated in FIG. 11, a play is awarded a 2 multiplier for 1 cross-match and a 10 multiplier for 2 cross-matches. This multiplier applies only to lower-tier prizes, not the jackpot. FIG. 12 is a composite prize table that consolidates the prize table in FIG. 10 and the multiplier information in FIG. 11. Following are two sample games. Numbers that match in the base game are circled and cross-matches are surrounded by a square.

Figure 13:
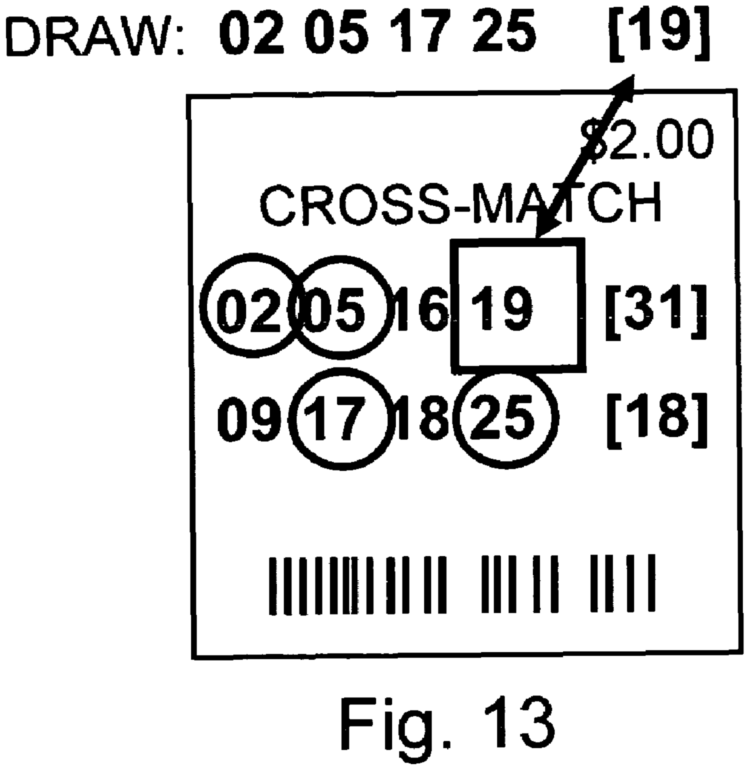
FIG. 13 illustrates a cross-match with an exemplary draw and ticket.

Example: The lottery draws 02, 05, 17, 25 for the regular numbers and 19 for the special number. The player's ticket is as in FIG. 13. It comprises two plays: ($1^{st}$ play) regular numbers: 02,05,16,19, and special number: 31, and ($2^{nd}$ play) regular numbers: 09,17,18,25, and special number: 18. Note that the $1^{st}$ play is Type A and the $2^{nd}$ is Type B as required.

For the $1^{st}$ play, 2 regular numbers (02 and 05) match 2 of the lottery's regular numbers. The special number for the $1^{st}$ play, 31, does not match the lottery's special number, 19. As the player's outcome is 2 regular matches and 0 special matches he is awarded $2 by the prize table in FIG. 10. Also, the $1^{st}$ play has 1 cross-match as one of the regular numbers, 19, matches the lottery's special number. By the table in FIG. 11, the player is awarded a 2 multiplier. The winnings for the first play are 2×$2=$4.

For the $2^{nd}$ play, 2 regular numbers (17 and 25), match 2 of the lottery's regular numbers. Also, the special number (18) does not match the lottery's special number (19). As the player's outcome is 2 regular matches and 0 special matches he is awarded $2 by the prize table in FIG. 10. However, there are no cross-matches as neither any of the player's regular numbers match the lottery's special number, nor does the player's special number match any of the lottery's regular numbers. The prize for the $2^{nd}$ play is $2. The total prize for this ticket is $4 ($1^{st}$ play)+$2 ($2^{nd}$ play)=$6.

Figure 14:
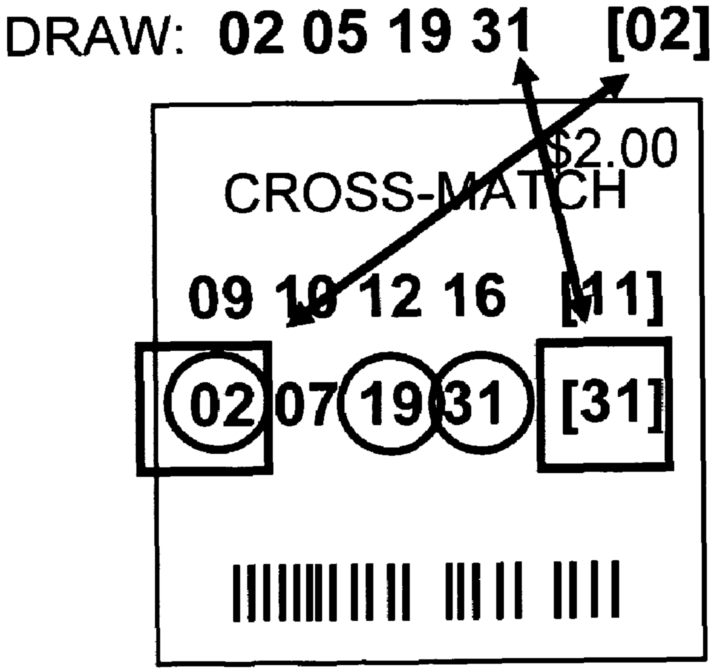
FIG. 14 illustrates a cross-match with an exemplary draw and ticket.

Example: The lottery draws 02, 05, 19, 31 for the regular numbers and 02 as the special number. The player's ticket is as in FIG. 14. It comprises two plays: ($1^{st}$ play) regular numbers: 09,10,12,16, and special number: 11, ($2^{nd}$ play) regular numbers: 02, 07, 19, 31, and special number: 31. Note that the $1^{st}$ play is Type A and the $2^{nd}$ is Type B.

For the $1^{st}$ play, none of the player's regular numbers match any of the lottery's regular numbers. Nor does the player's special number (11) match the lottery's special number, 02. Nor are there any cross-matches. This play does not win a prize for the $1^{st}$ play.

For the $2^{nd}$ play, 3 of the regular numbers (02, 19 and 31) match 3 of the lottery's regular numbers. The special number (31) does not match the lottery's special number (02). As the player's outcome is 3 regular matches and 0 special matches he is awarded $5 by the prize table in FIG. 10. Also, the play has two cross-matches: (1) one of the regular numbers, (02), matches the lottery's special number, and the special number, (31), matches one of the lottery's regular numbers. Notice that 02 is both circled and surrounded by a square as it is both a match in the base game and a cross-match. The play is awarded a 10 multiplier for 2 cross-matches by the table in FIG. 11. The prize for the $2^{nd}$ play is 10×$5=$50. The total prize for this ticket is $0 ($1^{st}$ play)+$50 ($2^{nd}$ play)=$50.

Those skilled in the art of Mathematics can confirm that this embodiment pays out 62.3% (which includes 20.0% for the jackpot) and has an overall win rate of 1 in 7.4.

It should be noted that this game exhibits short term volatility. The lottery's special number repeats one of its regular numbers about 1 in 7.75 draws. When this happens, the payout is on average 111.5%, vs. 55.0% for other draws.

Another variation on this embodiment is to incorporate set prizes based on cross-matches. For example, in the above embodiment, the prize for 2 cross-matches could be revised to be the greater of $5 and the multiplier (i.e., whatever value is obtained by applying the multiplier, which could be $0). This enhancement would increase the overall win frequency to 1 in 6.2 (as opposed to 1 in 7.4) and the payout to 69.3% (as opposed to 62.3%).

To elaborate on design details, it is recalled that in the above embodiment it is required that the two plays be of different types: Type A and Type B. This is done so that the value of a ticket is uniform. This discourages retailer theft as all tickets are of equal value. Also, it allows for tickets to be non-cancelable as no ticket has an advantage over another.

Also, it is recalled that in the above embodiment the player is allowed to select the regular numbers for the $1^{st}$ play (e.g. on the playslip in FIG. 17), but he is not allowed to select any numbers for the $2^{nd}$ play. This is not absolutely necessary, but it may be prudent. The $2^{nd}$ play (Type B) is more volatile than the $1^{st}$. For example, a large lower-tier prize of $25,000 is possible for the $2^{nd}$ play but not the $1^{st}$ play. Therefore, if a popular set of regular numbers is drawn (e.g., 01, 02, 03, 04), it will not affect prizes for the $2^{nd}$ play and create an unmanageable number of $25,000 prize winners.

Another embodiment is described that is conceived to be an enhancement of Embodiment 1 for a higher price. It may be run concurrently with Embodiment 1 using the same draw.

Figures 15, 16:
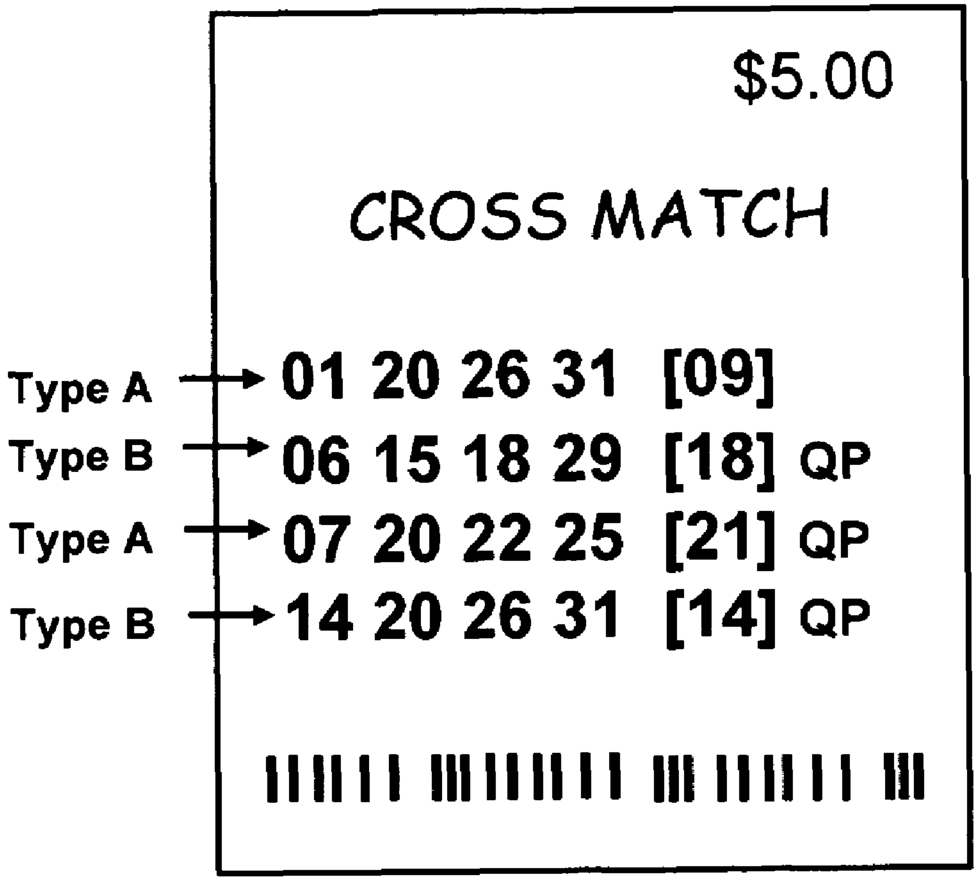
FIG. 15 is a cross-match prize table for a $5 game.
FIG. 16 is an exemplary ticket for a $5 game.

Embodiment 2: The player pays $5 for 4 plays. The base game prize table is the same as for the above disclosed embodiment, in FIG. 10, except the multiplier associated with 2 cross-matches has been enhanced. It is 20 as opposed to 10 for Embodiment 1, as indicated in FIG. 15. An exemplary ticket is shown in FIG. 16. It is required that there be two "Type A" plays and two "Type B" plays. An enticement for playing this $5 game verses the $2 version is that the player has an opportunity for a $50,000 prize, as opposed to $25,000.

(For example, if a player wins \$2,500 in the base game and 2 cross-matches, he wins 20×\$2,500=\$50,000 as opposed to 10×\$2,500=\$25,000.) Those skilled in the art of Mathematics can confirm that the return for this embodiment is 58.5% (which includes 16.0% for the jackpot) and that the overall probability of winning a prize is 1 in 3.9.

Those skilled in the art of Mathematics can confirm that the probabilities and other calculations in this description and in the related figures, whether explicitly mentioned in the description or not, are correct.

Figure 8:
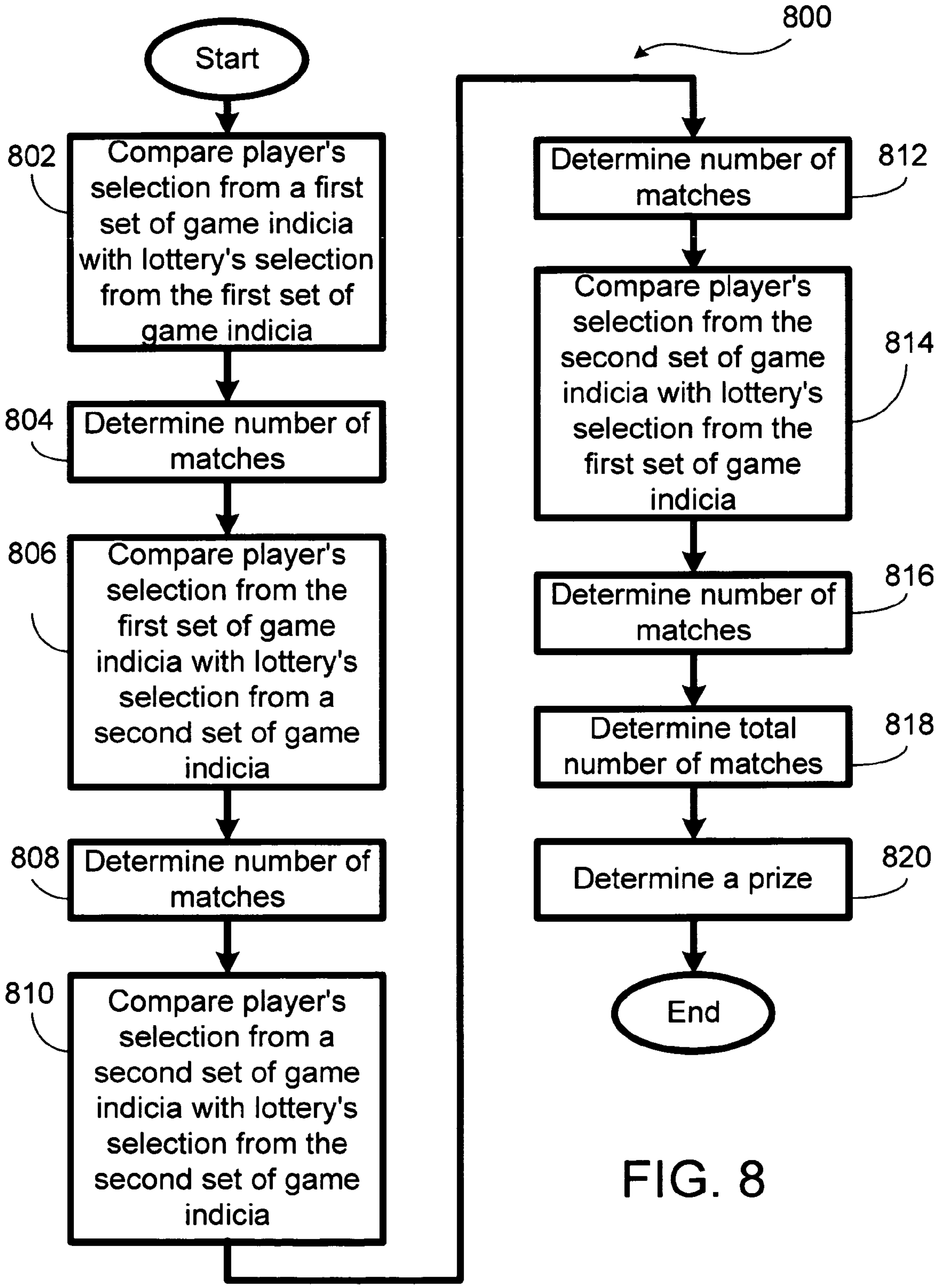
FIG. 8 is a server process according to one embodiment of the invention.

FIG. 8 is a flowchart 800 for an exemplary embodiment of a process according to the invention. After a player makes his selection for indicia from a first set of game indicia and indicia from a second set of game indicia, the lottery authority draws or selects its indicia from the first set of game indicia and indicia from the second set of game indicia. For example, the player may have selected (2, 5, 10, 11, 30) from the first set and (44) from the second set, and the lottery authority selected (2, 9, 11, 44, 45) from the first set and (5) from the second set. After the lottery authority has drawn its indicia, winners can be determined by comparing each player's selection with the lottery authority's selection. In this example, the player's indicia from the first set is compared with the lottery authority's indicia from the first set, step 802, and determine a number of matches, step 804. So (2, 5, 10, 11, 30) is compared with (2, 9, 11, 44, 45) and there are two matches. The player's indicia from the first set is also compared with lottery authority's indicia from the second set, step 806, and another number of matches is obtained, step 808. In this case there is a match between "5" from the player's first set of indicia and "5" from the lottery's second set of indicia. These comparing steps are repeated for the player's indicia selected from the second set, steps 810-816, and the number of matches from all the comparisons are added, step 818, and if the total number of matches exceeds a predetermined criteria set by the lottery authority, a prize is determined according to the number of matches, step 820. In this example, the total number of matches are three because the player's selection from the second set matches with a number from the lottery authority's section from the first set.

Figure 9:
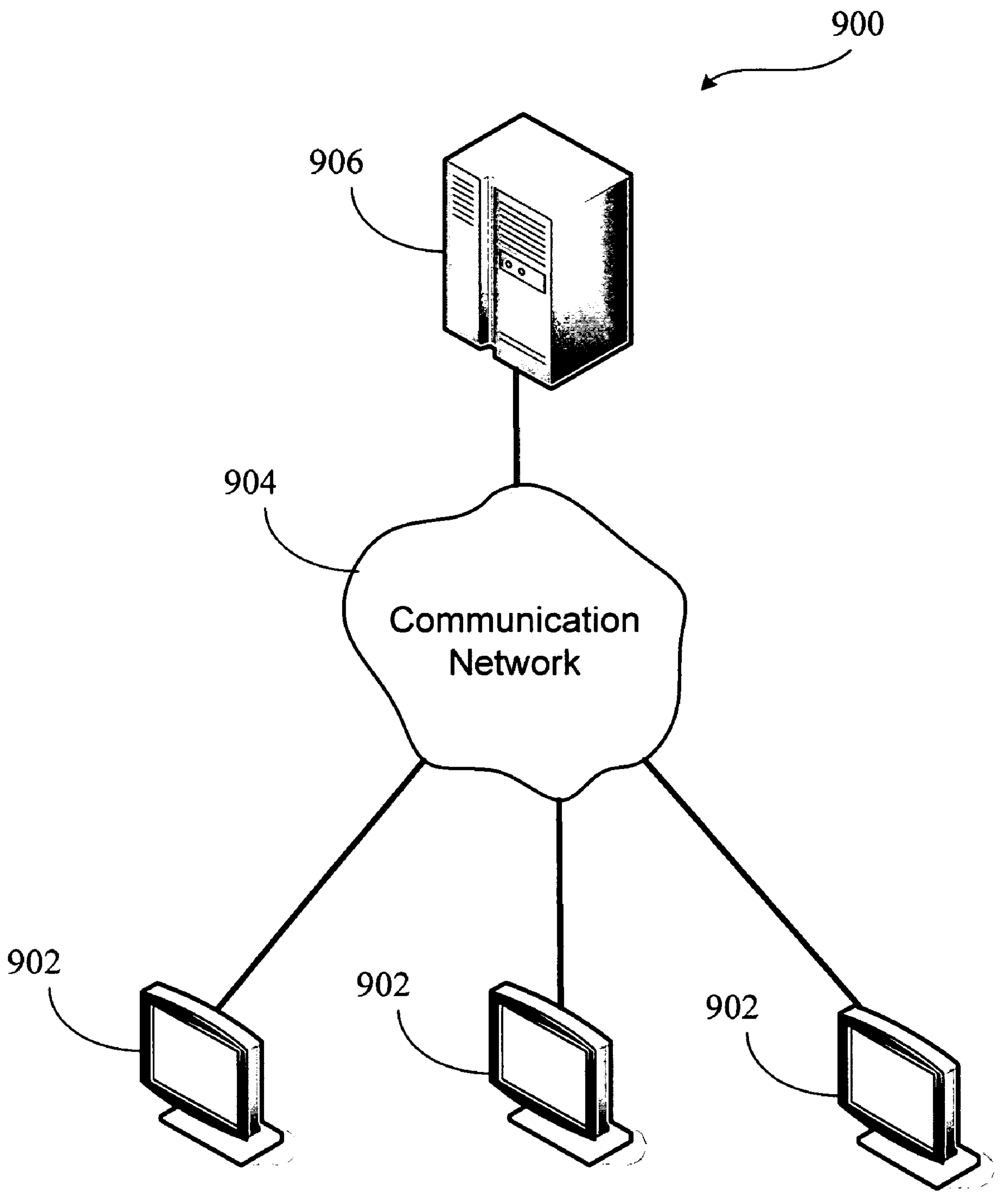
FIG. 9 is a network with several game devices supporting the present invention.

The invention can be based on a standalone gaming machine or a server. A standalone gaming device may include a display unit, a scanning unit (also known as a player input device) for scanning play slips containing player selection, and a ticket issuing unit for issuing tickets to players. The gaming device has a controller with a random number generator capable of performing quick picks for the player. The controller also takes player bets from the scanning device and issues a ticket to the player. After issuing the ticket, the controller generates a set of winning numbers, and determines if the player has a winning ticket according to the predefined rules. The gaming device may also be connected to a server as illustrated in FIG. 9. The gaming device 902 is connected to the server 906 through a communication network 904. In the embodiment illustrated in FIG. 9, each gaming device receives wagers and selections from players, passes betting information to the server 906, and issues tickets to the players. The server 906 receives player selections and determines winners based on the numbers selected by the lottery authority.

In the context of FIG. 8, the method may be implemented, for example, by operating a computer to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to one embodiment thereof, it will be understood by those skilled in the art that various changes in form and detail may be made without departing from the spirit and scope of the present invention as set forth in the following claims. Though, the method in FIG. 8 is illustrated in sequential steps, those skilled in the art will appreciate the different sequences may also be used to implement the invention. Furthermore, although elements of the invention may be described or claimed in the singular, the plural is contemplated unless limitation to the singular is explicitly stated.

What is claimed is:

1. A computer based lottery game method wherein a computer executes machine-readable instructions to implement the lottery game, the lottery game method comprising the steps of:

receiving a single wager amount wager from a player for a single game play in the lottery game, wherein each single game play includes the following:

a player receiving a first plurality of indicia selected from a first set of indicia for a single wager amount;

the player receiving a second at least one indicia selected from a second set of indicia in the same single game play without an additional wager from the player;

wherein the single game play requires the player to receive the player's first plurality of indicia and the player's at least one indicia from the second set of indicia;

a lottery authority selecting a first plurality of indicia selected from the first set of indicia;

the same lottery authority selecting a second at least one indicia selected from the second set of indicia in the same single game play;

comparing the first plurality of indicia received by the player with the first plurality of indicia selected by the lottery authority and determining a first number of matches from the comparison of the first plurality of indicia received by the player with the first plurality of indicia selected by the lottery authority;

in the same single game play, cross-matching and comparing the second at least one indicia received by the player with the first plurality of indicia selected by the lottery authority and determining a second number of matches from the cross-match comparison of the second at least one indicia received by the player with the first plurality of indicia selected by the lottery authority;

in the same single game play, cross-matching and comparing the first plurality of indicia received by the player with the second at least one indicia selected by the lottery authority and determining a third number of matches from the comparison of the first plurality of indicia received by the player with the second at least one indicia selected by the lottery authority;

in the same single game play, comparing the second at least one indicia received by the player with the second at least one indicia selected by the lottery authority and determining a fourth number of matches from comparison of the first plurality of indicia received by the player with the second at least one indicia selected by the lottery authority; and awarding a prize in the same single game play based on the said first, second, third and fourth numbers of matches, wherein the prize is based on an award for the total number of matches from the first and fourth numbers of matches multiplied by a factor that depends on the total number of cross-matches from the second and third numbers of matches.

2. The method of claim 1, wherein the said first set of indicia, the said first plurality of indicia received by the player, and the said first plurality of indicia selected by the lottery authority has a different parameterization than the said second set of indicia, the said second at least one indicia received by the player, and the said second at least one indicia selected by the lottery authority.

3. The method of claim 2, wherein the lottery game is an extension game to a base game.

4. The method of claim 2, wherein the first plurality of indicia received by the player being received from a player's input.

5. The method of claim 2, wherein the second at least one indicia received by the player being received from a random number generator.

6. A system for playing a lottery game, comprising:

a communication network;

at least one gaming machine in communication with the communication network; and a server in communication with the at least one gaming machine through the communication network, the server hosting the lottery game, wherein for each single game play of the lottery game wagered on by a player, the at least one gaming machine is configured for receiving from a player a first plurality of indicia selected from a first set of indicia for a single wager amount, in the same single game play, receiving from the player at least one second indicia selected from a second set of indicia without an additional wager from the player;

wherein the single game play requires the player to receive the player's first plurality of indicia and the player's at least one indicia from the second set of indicia;

transmitting information on the first plurality of indicia and the at least one second indicia to the server via the communication network, wherein for each single play of the lottery game based on the player's single wager, the server configured for receiving from a lottery authority a first plurality of indicia selected from the first set of indicia, receiving from the same lottery authority a second at least one indicia selected from the second set of indicia, comparing the first plurality of indicia received by the player with the first plurality of indicia selected by the lottery authority and determining a first number of matches from the comparison of the first plurality of indicia received by the player with the first plurality of indicia selected by the lottery authority;

in the same single game play, cross-matching and comparing the second at least one indicia received by the player with the first plurality of indicia selected by the lottery authority and determining a second number of matches from the comparison of the second at least one indicia received by the player with the first plurality of indicia selected by the lottery authority;

in the same single game play, cross-matching and comparing the first plurality of indicia received by the player with the second at least one indicia selected by the lottery authority and determining a third number of matches from the comparison of the first plurality of indicia received by the player with the second at least one indicia selected by the lottery authority;

in the same single game play, comparing the second at least one indicia received by the player with the second at least one indicia selected by the lottery authority and determining a fourth number of matches from the comparison of the first plurality of indicia received by the player with the second at least one indicia selected by the lottery authority; and the server further configured for awarding a prize based on an award for the total number of matches from the first and fourth numbers of matches multiplied by a factor that depends on the total number of cross-matches from the second and third numbers of matches.

7. The system of claim 6, wherein the gaming device further being capable of issuing to the player a ticket containing the information on the first plurality of indicia and the at least one second indicia.

* * * * *